June 20, 1961  J. R. SMITH, JR  2,989,193
RACK ATTACHMENTS
Filed Oct. 28, 1960  3 Sheets-Sheet 2
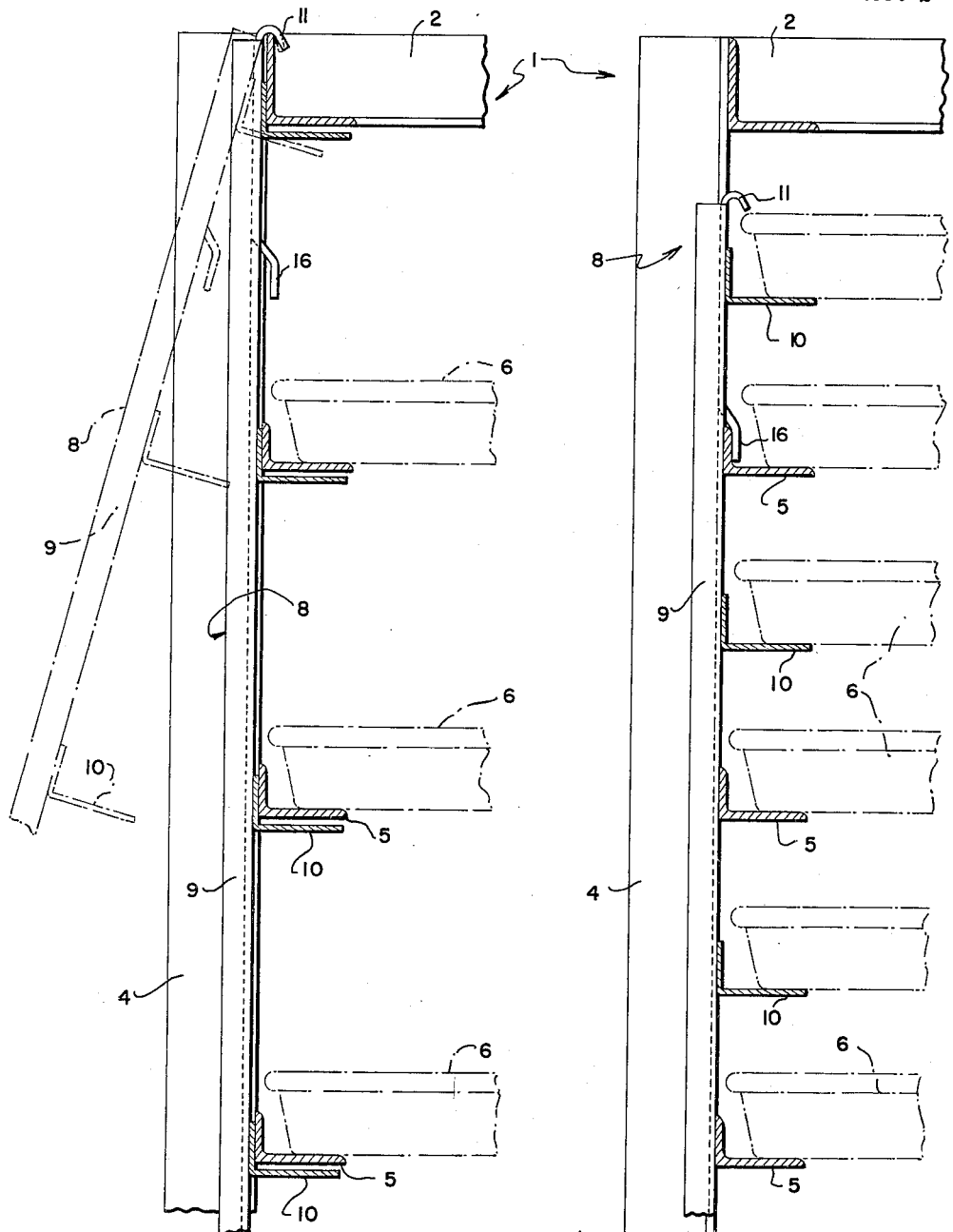
INVENTOR
JOHN ROY SMITH, JR.
BY
ATTORNEY June 20, 1961    J. R. SMITH, JR    2,989,193
RACK ATTACHMENTS
Filed Oct. 28, 1960    3 Sheets-Sheet 3
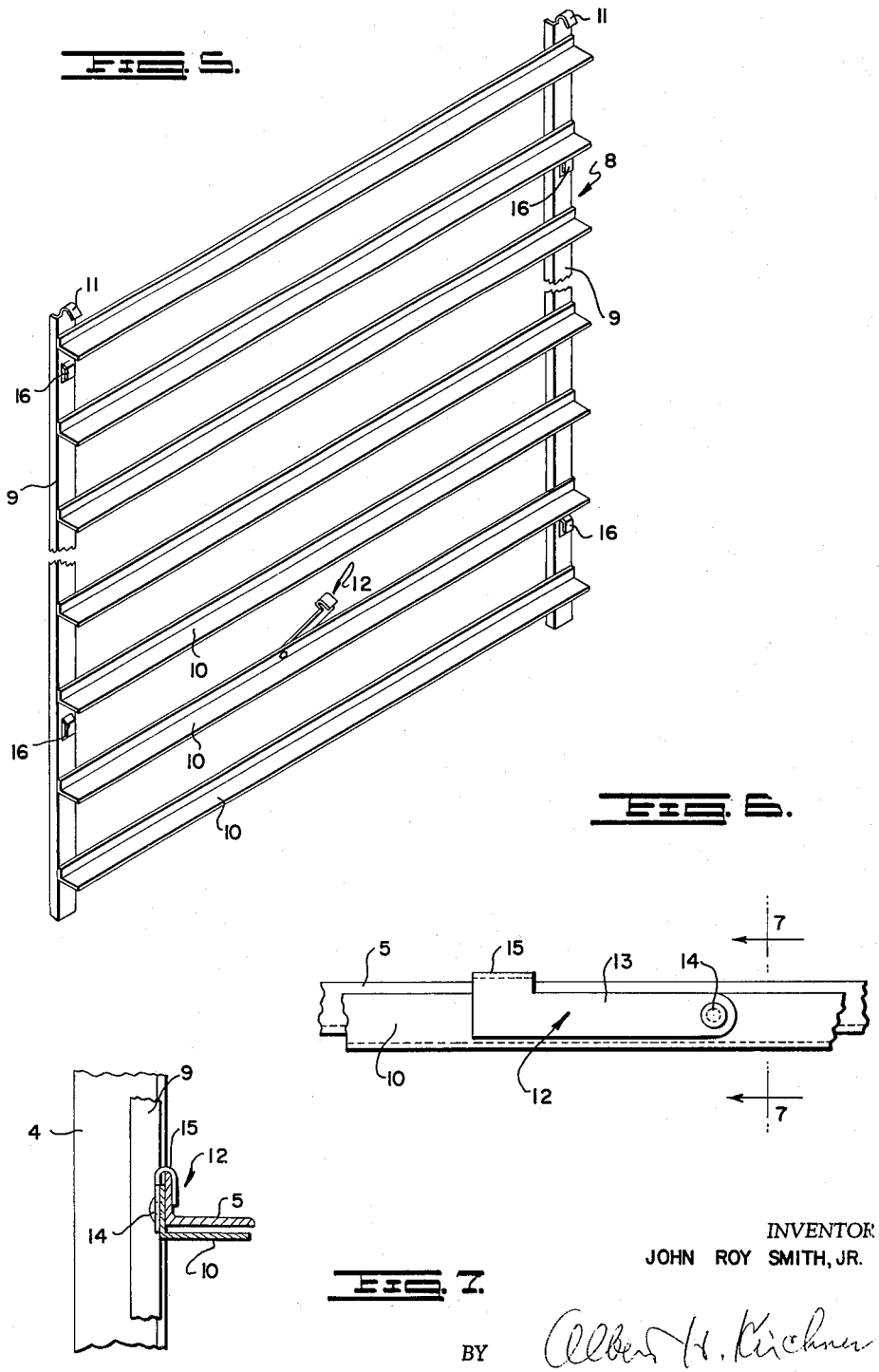
INVENTOR
JOHN ROY SMITH, JR.
BY  *Albert H. Kirchner*
ATTORNEY

United States Patent Office 2,989,193
Patented June 20, 1961

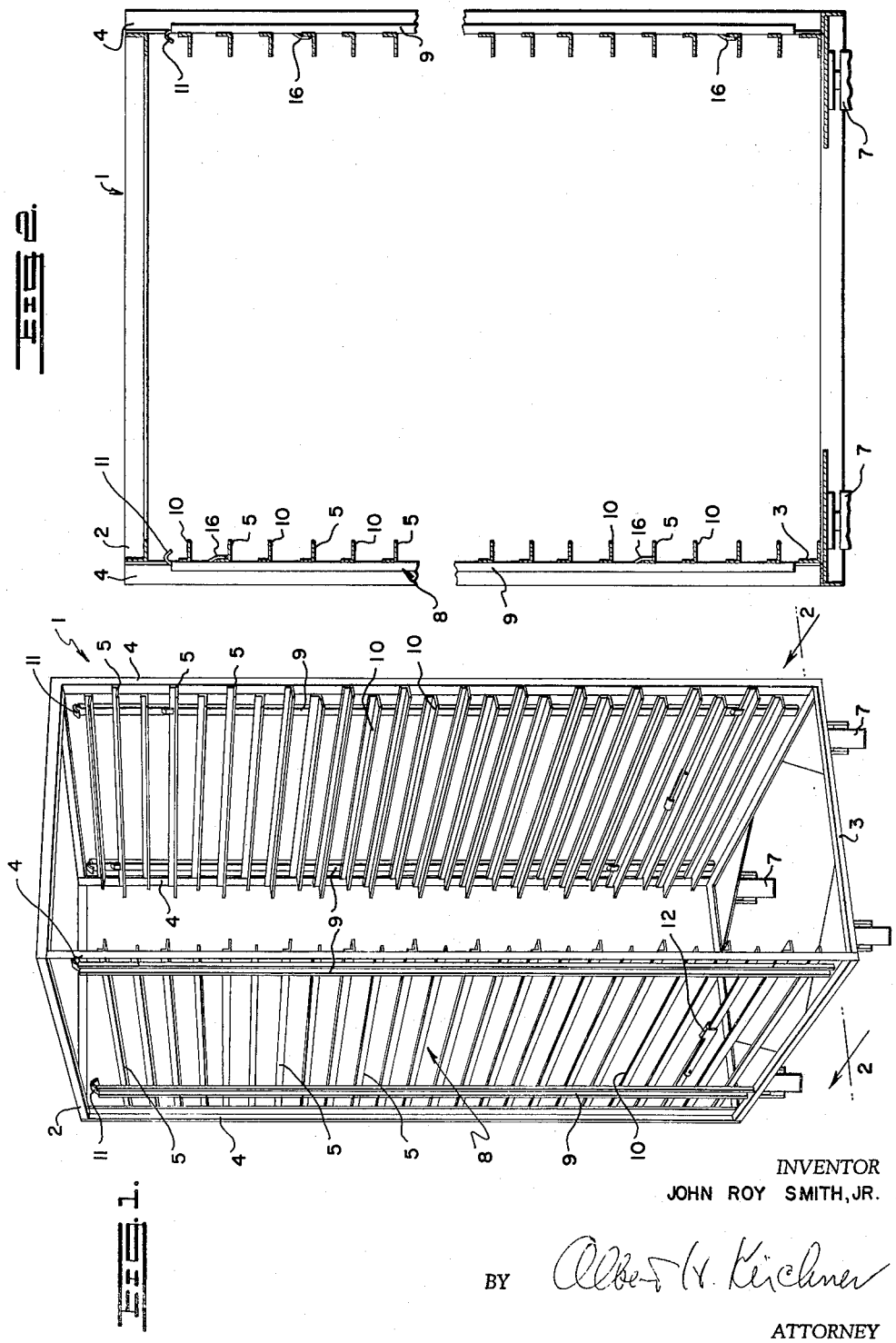

2,989,193
RACK ATTACHMENTS
John Roy Smith, Jr., Mobile, Ala., assignor to Smith's Bakery, Inc., Mobile, Ala., a corporation of Alabama
Filed Oct. 28, 1960, Ser. No. 65,851
8 Claims. (Cl. 211—183)

The present invention relates to racks, and more particularly to portable, castered racks of the general type comprising a skeletonized frame structure for supporting a plurality of shallow pans in superposed spaced relation. The invention provides means functioning as an attachment for such racks for substantially doubling their pan-supporting capacity.

Racks of the general type to which the new attachment may be applied are widely used in commercial bakeries for mounting pans containing baked products fresh out of the ovens and transporting them about the plant. Each such rack consists of a framework, mounted on rollers or casters, and providing a pair of opposed vertical banks of horizontal runners, generally in the form of angle irons having horizontal flanges forming ledges which act as slides or ways on which the side margins of wide shallow pans are received. The pans contain bakery products, and the purpose of each pair of opposed angle irons at the same level is to provide individual support for one pan, so that a plurality of pans may be superposed in the rack at proper vertical spacing to accommodate the contained bakery products without subjecting the contents of any pan to contacts with or pressure from any superposed pan.

It will be recognized that maximum pan capacity of any rack will be achieved by spacing the pans vertically apart the minimum distance required by the products that are intended to be contained in the pans. Such minimum spacing will be considerably greater when the pans are to be filled with loaves of bread, for example, than when they are to be loaded with products of less height, such as doughnuts, buns, cookies or the like. Consequently a rack having its runners properly spaced for holding pans containing loaves of bread is inefficient when used for any of the smaller, or lower bakery products, and conversely a rack having its runners properly spaced for maximum capacity of pans used with doughnuts, buns, small cakes and the like cannot be used for handling pans containing bread.

The standard and best construction for the racks includes riveting, bolting or welding the runers to the uprights or corner posts in order to provide the high degree of rigidity required to enable the rack to withstand hard usage without separation or loosening of the parts. Hence it is mechanically and structurally impractical to attempt to make the runners adjustable on the uprights so that more or fewer of them might be attached at greater or less spacing as might be required for the pans intended to be used with different products. Moreover, any such interchanging and replacement would be much too time-consuming to be tolerated in use. The present invention provides a different solution of the problem.

Accordingly, the principal purpose of the invention is to provide an attachment for a standard bread pan carrying rack by which the basic rack can be readily converted to use in supporting approximately double the number of pans at sufficient spacing to accommodate the smaller or lower bakery products.

Related objects are to provide an attachment of the foregoing type which is simple and economical to construct, which will be devoid of moving parts and as durable as the rack itself, which will be always at hand attached to the rack in what may be regarded as an inoperative position in which it works no change in the capacity of the rack or in the operative position in which it performs its function of increasing the capacity, which will be securely latched in position in the operative position so as to be proof against accidental displacement with resulting dislodging of the pans, and which can be applied and removed and shifted from or to either of its two applied positions easily and instantly by anyone, without requiring any tools or skill.

Other objects and advantages of the invention in general and of the preferred embodiment in particular will be evident from the following specification of the structure shown in the accompanying drawings which has been reduced to actual practice and found entirely satisfactory and hence is presently preferred.

In the drawings,

FIGURE 1 is a perspective view of a standard type of bakery pan rack equipped with a pair of the attachments provided by the invention set up in operative position for substantially doubling the pan capacity of the rack;

FIG. 2 is a front elevational view, on a larger scale, partly broken away, showing each of the two opposed banks of runners of the rack with one of the attachments applied in capacity-increasing position;

FIG. 3 is a fragmentary front elevational view, on a still larger scale, showing one of the attachments applied in inoperative position to a rack bank, working no increase in pan capacity;

FIG. 4 is a similar view showing the attachment applied in operative position, doubling the pan capacity of the rack;

FIG. 5 is a perspective view, partly broken away, of one of the attachments per se;

FIG. 6 is a fragmentary detail elevational view of a pair of juxtaposed rack and attachment runners showing the latch by which the attachment is secured to the rack; and FIG. 7 is a cross sectional view taken on the line 7—7 of FIG. 6.

In these figures, the reference numeral 1 designates generally a conventional type of rack comprising a rigid framework formed of structural members of angle iron or channel shape connected by welding, bolting or otherwise into a skeleton assembly of rectangular upper and lower frames 2 and 3, respectively, at the top and bottom of four corner posts 4. The two corner posts at each side of the framework are connected by a plurality of horizontal runners 5, welded, riveted or bolted to the posts, spaced uniformly vertically apart, and each consisting of a length of angle iron having one of its flanges disposed in a vertical plane and the other in a horizontal plane facing the corresponding flange of a runner of the opposite bank and at the same level. The two banks of runners are identical, and both are open to the front and back of the rack so that wide flat pans 6 (see FIGS. 3 and 4) can be slid into and out of the front or rear of the rack and be supported on the runners. Swivelled roller or caster assemblies 7 can be provided on the lower frame 3 so that the rack can be pushed about to various locations around the floor.

The foregoing is the standard construction used in bakeries for handling baked products between the ovens and the stations at which subsequent processing steps are performed, such as slicing and wrapping in the case of loaves of bread, or icing and packaging in the case of cookies, buns, doughnuts and the like. FIG. 3 shows the pans supported in operative position on the runners 5 and illustrates the relatively wide spacing of the runners required to permit the pans to be used in the handling of loaves of bread, which are usually the highest of the large scale products of the average bakery.

The attachment provided by the invention is designated as a whole by the reference numeral 8 and comprises a generally ladder-like rigid assembly of two uprights 9 and a plurality of horizontal runners 10 welded, riveted or bolted at their ends to the uprights. Both the uprights and the runners are best made of similar or identical angle iron members, which makes it convenient to connect the relatively narrow vertical flanges of the runners directly to the relatively wide flanges of the uprights, as best shown in FIG. 5. The runners 10 are spaced apart at exactly the same intervals as the runners 5 of the rack 1. Each of the uprights 9 is surmounted by a hook 11, which may be struck integrally out of the wide flange of the upright and turned forwardly or inwardly, over the vertical plane of the runners 10, as best shown in FIG. 5. The spacing of the hooks 11 above the topmost runner 10 should be such that when the two hooks of an attachment are engaged over the side member of the upper frame 2 of a rack 1 the attachment will hang from the frame 2 and each of the runners 10 of the attachment will nest snugly with one of the runners 5 of the rack, the vertical flanges of the respective runners being engaged with each other and the horizontal flanges of the attachment runners 10 underlying the horizontal flanges of the rack runners 5 in substantial contact or in closely spaced relation, as shown in full lines in FIG. 3. The attachment uprights 9 being set somewhat closer together than the corner posts 4 of the rack, as shown in FIG. 1, and these uprights being somewhat shorter than the corner posts, makes it possible for the attachment to fit snugly in position on the rack, as shown in FIG. 1. Stability and security may be provided by equipping one of the lower runners 10 of the attachment with a latch 12 (see FIGS. 5, 6 and 7). This may comprise a short arm 13 having one end pivoted at 14 to the vertical flange of the runner 10 and having at its other end an inverted channel portion 15 forming a hook which can be dropped down over the juxtaposed vertical flanges of the runners 10 and 5 and prevent their being separated by swinging the attachment out, as to the broken line position of FIG. 3.

With the runners 10 nested under the runners 5, the attachments are in their inoperative position, i.e., each is secured to one of the banks of the rack in such a way that there is no interference with the runners 5 of the rack. That is to say, the spacing between pairs of adjacent superposed runners of the rack exposed for support of the pans 6 is exactly the same as if the attachments were not present. This relationship of the runners is shown in FIG. 3, from which it will be noted the pans are supported with the full clearance between adjacent superposed pans for which the rack was designed, so that high products such as loaves of bread can be accommodated by the pans.

The operative position of the attachments is depicted in FIGS. 1, 2 and 4. Here each of the attachments is lowered one-half the spacing of the runners, and is secured in this position on its bank of the rack, so that each of the runners 10 of the attachment will be positioned midway between two of the runners 5 of the rack. This combination of the runners 5 and 10, all exposed in operative position, is substantially double the number of runners 5. All of them are set at equal half-spacing, for supporting substantially twice the number of pans 6, and providing for each of them half the vertical clearance afforded by the runners 5, as is perhaps best shown in FIG. 4. As will be understood, such half clearance is quite sufficient for certain smaller bakery products, and this doubling of the capacity of the rack to handle such products consequently achieves the principal object of the invention.

Connection of the attachments to the rack in the operative position shown in FIGS. 1, 2 and 4 is best made by forming a number of hooks on each of the uprights 9 of the attachments. These hooks, designated 16, are set at such positions on the uprights that when they are engaged over the vertical flanges of the appropriate rack runners the attachment runners will be in the required half space setting. They may be struck out of the wider flange of the uprights, or may be made of separate straps of metal welded or bolted to the uprights, and are best shaped as shown in the figures, so as to provide flat parallel pocket surfaces for making snug holding engagement with the rack runner flanges. It is deemed best to provide two hooks 16 on each of the uprights 9, one near the top and one near the bottom, and to set the two top hooks of each attachment at different levels and the two bottom hooks at different levels, as best shown in FIG. 5. In this way each attachment is supported by four of the rack runners 5, and the whole assembly is very secure and stable.

I claim:

1. An auxiliary runner attachment for increasing the pan capacity of a pan-supporting rack of the type comprising a rigid fixed skeleton structure having two laterally separated banks of superposed runners fixed at uniform vertical spacing to receive and support a plurality of pans, said attachment comprising a frame for each bank, each frame comprising a plurality of runners, laterally spaced uprights connecting said runners and fixing them in vertically superposed spacing substantially equal to the spacing of the rack runners, and means carried by each frame for securing it to a bank of the rack alternatively in one position with each of the frame runners at substantially the level of one of the rack runners and in another position with each of the frame runners vertically spaced from an adjacent rack runner by substantially half of said rack runner spacing, thereby substantially doubling the pan capacity of the rack.

2. An attachment as claimed in claim 1 in which each of the attachment frame runners is an angle iron adapted in one position to engage angle iron runners of the rack in nested relationship.

3. An attachment as claimed in claim 1 in which each of the laterally spaced uprights of the attachment is surmounted by a hook for hanging the attachment on an upper runner of the rack.

4. An attachment as claimed in claim 1 in which each of the laterally spaced uprights of the attachment has a hook below its upper end for hanging the attachment on a runner of the rack.

5. An attachment as claimed in claim 1 in which each of the laterally spaced uprights of the attachment is surmounted by a hook for hanging the attachment on an upper runner of the rack and has another hook below the upper end of the attachment for hanging the attachment on a lower runner of the rack.

6. An attachment as claimed in claim 1 in which each of the laterally spaced uprights of the attachment is surmounted by a hook at the same level for hanging the attachment on an upper runner of the rack and in which two other hooks are provided at two other lower levels on said uprights for hanging the attachment on two lower runners of the rack.

7. An attachment as claimed in claim 1 in which the means for securing the frame to a bank of the rack includes a latch for fixing one of the frame runners to one of the rack runners and preventing outward swinging movement of the frame runner from the rack runner.

8. An attachment as claimed in claim 7 in which the latch is an arm having one end pivoted on one of the frame runners and having at its other end an inverted channel portion adapted to be lowered down onto vertical portions of said frame runner and an adjacent rack runner when the frame is in said first named position.

References Cited in the file of this patent

UNITED STATES PATENTS

| | | |
|---|---|---|
| 1,114,455 | Fisher | Oct. 20, 1914 |
| 1,191,198 | Kuhn | July 18, 1916 |